Feb. 17, 1959 F. L. BECHLEY 2,874,212

GENERATOR OF COLOR IMAGES FROM MONOCHROME TELEVISION SIGNALS

Filed July 29, 1955

INVENTOR.
Fred Lorin Bechly
BY
ATTORNEY 2,874,212
Patented Feb. 17, 1959

2,874,212

GENERATOR OF COLOR IMAGES FROM MONOCHROME TELEVISION SIGNALS

Fred Lorin Bechley, West Collingswood, N. J., assignor to Radio Corporation of America, a corporation of Delaware Application July 29, 1955, Serial No. 525,146
3 Claims. (Cl. 178—5.4)

The present invention relates to novel color television apparatus and, particularly, to apparatus for deriving, from a monochrome or black and white television signal, signals representative of a plurality of colors so that a multi-color image may be ultimately reproduced from the single monochrome signal.

It is accordingly a primary object of the present invention to provide novel means for deriving from a single television signal a plurality of signals capable of providing a multi-color image.

In a simultaneous color television system of the type suitable for reception of color television signals standardized by the Federal Communications Commission on December 17, 1953, video signals respectively representative of the brightnesses of the component colors of an image to be reproduced are derived through the agency of scanning means respectively sensitive to the component colors of the image. The color-representative video signals are combined in a suitable manner to form a luminance signal representative of the brightness of elemental areas of the television subject and are also processed by matrix and modulator means to form a subcarrier wave which is both phase- and amplitude-modulated to indicate respectively the hue and saturation of corresponding areas of the subject. The present invention may be used in conjunction with such a color television system for causing the system to produce a multicolor image from a monochrome television signal of the type which is derived, for example, from a single television camera pickup device.

In accordance with a specific form of the invention to be described herein by way of illustration, there is provided a source of monochrome television signals such, for example, as a television camera tube adapted to scan a subject. The video signals thus produced by the camera tube are applied to one of the three color channels of a simultaneous color television system of the type described. Means are additionally provided for inverting the phase of the video signals produced by the camera and for applying the inverted video signals, suitably modified as to blanking polarity in a manner to be described, to a second color channel of the system. Means may be additionally provided in accordance with the invention for applying a constant amplitude signal to the third color channel of the system, thereby to increase the number of colors which can be reproduced by the system.

As will be understood, the present invention may be advantageously employed in the production of color test signals from monochrome video signals. The invention is also useful, for example, as a relatively inexpensive arrangement for producing color displays from monochrome signals as in commercial announcements, titles and the like.

Additional objects and advantages of the present invention will become apparent to those skilled in the art from a study of the following detailed description of the accompanying drawing, in which.

Figures 1, 2, 3, 4:
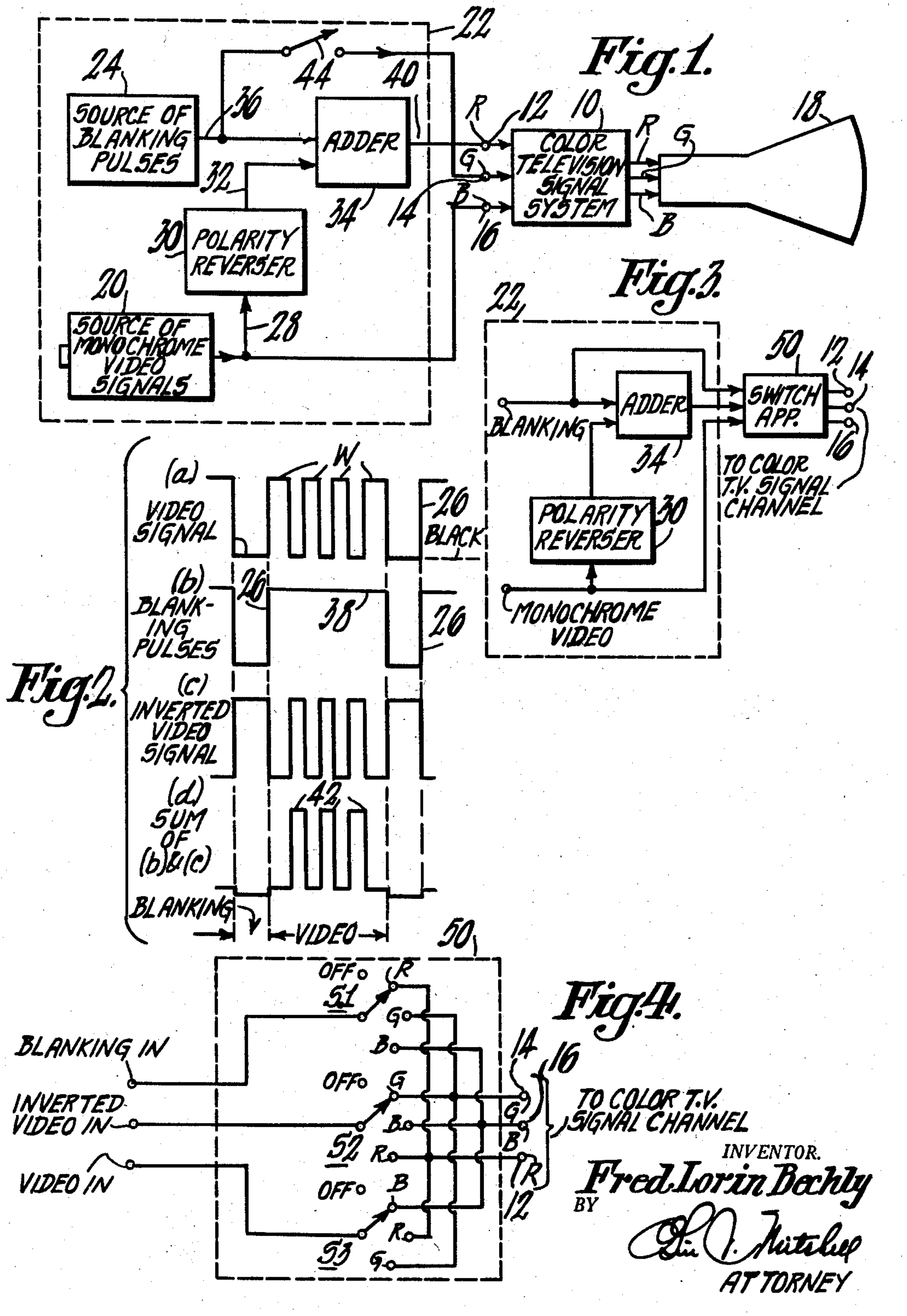
Fig. 1 illustrates, by way of a block diagram, one arrangement in accordance with the present invention.
Fig. 2 illustrates a series of wave forms to be described in connection with the arrangement of Fig. 1.
Fig. 3 is a block diagram illustrative of another form of the invention.
Fig. 4 illustrates schematically a switching arrangement useful in the apparatus of Fig. 3.

Referring to the drawing and, particularly, to Fig. 1 thereof, there is shown a color television signal system as represented by the block 10. By way of example, the color television system represented in Fig. 1 may be of the type described in detail in a book entitled "Practical Color Television for the Service Industry," revised edition, April 1954, second edition, first printing, published by the RCA Service Co. Inc., a Radio Corporation of America subsidiary. In such a system, and as described by the cited book, video signals respectively representative of the red, green and blue content of a television subject are derived by scanning the subject with means sensitive to those colors. The color video signals are then combined to form a luminance signal representative of the brightness of elemental areas of the subject and are also employed in producing a chrominance signal representative of the colors of the subject. These luminance and chrominance signals may, for example, be transmitted on a radio frequency carrier wave to a suitable receiving apparatus which serves to reconstruct from the transmitted and received signals the individual color-representative video signals originally derived by scansion of the television subject. In a receiver of the type described in the cited publication, the individual color video signals are employed in modulating the respective intensities of a plurality of electron beams in a color image reproducing kinescope, each of the beams being adapted to impinge upon and illuminate selected color light-producing areas of the kinescope screen.

From the foregoing, therefore, it may be understood, by way of example, that the block 10 is representative of that portion of the color television system which is located electrically between the source of the several color representative signals and that point in the system before the color image reproducing device at which the individual color video signals are reconstructed for use in the described manner. The separate color input channels of the system 10 are represented by the terminals 12, 14 and 16 which are designated, respectively, as the red, green and blue channels. The color image reproducing device is represented diagrammatically by the kinescope 18 to which the color video signals are applied via the lead labeled R, G and B.

As is understood by those skilled in the art, the red, green and blue color representative video signals normally employed in such a system are in the nature of electrical wave forms whose amplitudes are, respectively, representative of the intensity of light of those colors. In accordance with the present invention, means are provided for deriving from a monochrome television signal such as an ordinary black and white signal signals useful in causing the system to produce a color image. Thus, the block 20 in Fig. 1 bears the designation "source of video signals" and will be understood as comprising, for example, a single television camera pickup tube such as the type normally employed in the derivation of monochrome television signals.

Assuming that the apparatus of the present invention (indicated within the dotted line in rectangle 22) is associated with a conventional color television broadcast transmitter, it will be understood that the transmitter apparatus also includes a suitable source of blanking pulses 24 which are produced in the transmitted signal for blanking the horizontal and vertical retrace paths of the electron beams at the image reproducing kinescope, Wave form (*a*) of Fig. 2 illustrates a composite monochrome television signal as produced from the source 20. The signal includes blanking impulses 26 between successive television line scans, the video information being contained between the blanking pulses. The video signal of Fig. 2(*a*) is of such polarity that the negative peaks of the blanking pulses 26 represent black level. In the illustrative wave form shown, the signal is representative of alternate white and black vertical bars, the white bars being represented by the positive-going pulses indicated by reference character "W." The video signals from the source 20 are applied, after suitable amplification (not shown) to one of the terminals of the color television system 10. In Fig. 1, the video signals are illustrated as being applied to the blue channel input terminal 16. The video signal shown in Fig. 2(*a*) and which will be referred to hereinafter for convenience as the monochrome video signal is also applied via a lead 28 to the input terminal of a polarity reversing stage 30. The polarity reverser 30 may, for example, comprise simply an amplifier which receives the monochrome signal on its control electrode and which delivers the phase inverted version thereof at its anode load terminal. The phase inverted monochrome signal is applied from the phase inverter 30 via a lead 32 to one input terminal of an adder circuit 34. The inverted video signal is illustrated in Fig. 2(*c*) and, as may be seen therefrom, is a substantial duplicate of the original monochrome signal except that it is of reverse polarity. In addition to the reversal of polarity of the video portion of the monochrome signal, however, the phase inverter 30 will also be understood as having reversed polarity of the blanking pulses 26. Means are therefore included in accordance with the invention for modifying the sense of the blanking pulses of the inverted signal to accord with the polarity of the blanking pulses of the original monochrome signal. Such means will now be described.

The blanking pulse source 24 alluded to earlier provides at its output lead 36 a wave form such as that shown in Fig. 2(*b*) which consists of blanking pulses 26 between which there occurs a voltage of substantially fixed white level. The blanking pulses 26 from the source 24 are applied to a second input terminal of the adder 34 so that the latter circuit serves to add the negative-going blanking pulses 26 of wave form (*b*) of Fig. 2 to the wave form (*c*) of Fig. 2, whereby to provide at its output lead 40 a signal illustrated by wave form (*d*) of Fig. 2 wherein the blanking pulses are of the same sense as those of wave form (*a*). The output lead 40 of the adder 34 is indicated as connected to another of the color channel input terminals 12 of the system 10.

In the interest of describing completely the environment of the apparatus of Fig. 1, it may be noted that the terminals 12, 14 and 16 of the system 10 may comprise the input terminals of a conventional colorplexer such as that described and shown in an article by Gloystein and Turner entitled "The Colorplexer—a Device for Multiplexing Color Television Signals in Accordance With the N. T. S. C. Signal Specifications" which appeared in the January, 1954, issue of Proceedings of the I. R. E. The monochrome video signal applied to the blue signal terminal 16 of the television system 10 causes the system to reproduce blue bars where each of the white bars W occur in the monochrome signal. Similarly, the phase inverted and modified signal of wave form (*d*) of Fig. 2 which is applied to the red signal terminal 12 of the system causes the system to reproduce red during the interval of the positive-going pulses 42 which occur, in time, between the positive pulses of the original monochrome signal. As thus far described, therefore, the image produced by the kinescope 18 at the output of the color television system will consist of alternate blue and red vertically oriented bars or stripes. It will thus be appreciated that the apparatus within the dotted line rectangle 22 of Fig. 1 serves to synthesize color-representative video signals from a single monochrome television signal.

Fig. 1 additionally illustrates means for increasing the number of color combinations which may be synthetically produced from a monochrome signal. A signal path from the lead 36 at the output terminal of the blanking pulse source 24 may be completed by closing the switch 44, so that blanking pulses are applied to the green signal terminal 14 of the color system. The effect of the application of the blanking pulses 26 (wave form (*d*) of Fig. 2) to the green signal terminal is that of causing the system to produce green throughout each television line interval. The effect upon the color image produced by the kinescope 18 is, therefor, that of changing the alternate blue and red bars to magenta and yellow bars.

While, in the illustrative example of Fig. 1, the monochrome and inverted signals are shown as being applied to the blue and red signal terminals, respectively, of the color television system and with the blanking pulses applied to the green signal terminal, it will be borne in mind that any combination of connections may be employed. Fig. 3 illustrates, therefore, a form of the invention in which includes switching means indicated by the block 50 between the color signal synthesizing arrangement 22 and the color television signal system. The switching apparatus 50 in Fig. 3 may comprise any suitable arrangement for selectively connecting the monochrome, inverted monochrome and blanking signals to the input terminals 12, 14 and 16 of the color television system.

While the type of switching apparatus employed in the block 50 depends upon the total number of possible color combinations desired, Fig. 4 illustrates schematically within the dotted line rectangle 50 one switch arrangement whereby 30 color combinations are possible. That is to say, any one of the monochrome, inverted monochrome and blanking signals may be applied selectively to any one of the red, green or blue signal terminals 12, 14 and 16, respectively, of the color system. The arrangement of Fig. 4 comprises 3 switches S1, S2, and S3, each of which includes a movable rotary member and four stationary terminals designated "off," R, G, and B. Each of the stationary terminals R is connected to each of the others similarly designated and to the terminal 12, while the green and blue stationary terminals are similarly interconnected and to the terminals 14 and 16. Thus, in accordance with the apparatus of Fig. 4, any one of the three input signals may be connected to any one of the terminals 12, 14 and 16 or effectively turned off by connecting the rotary member of its associated switch to the "off" terminal. With the apparatus of Fig. 3, 30 possible combinations of the primary colors red, green and blue and their mixture colors are afforded. If desired, additional switches may be provided for permitting the application of one of the three signals simultaneously to two of the input terminals of the color television system, thereby affording 24 additional possible color combinations. In view of the fact that either the monochrome signal or the inverted monochrome signal may be applied to all three of the terminals of the system, two additional possibilities (i. e., black-and-white and white-and-black) are available.

Having thus described my invention, what I claim as new and desire to secure by Letters Patent is:

1. Apparatus for synthesizing simultaneous color television signals from a monochrome television signal, which apparatus comprises: a source of monochrome television signals including recurrent blanking pulses of fixed, reference amplitude and image portions representative of alternate black and white areas of an image to be reproduced; a colorplexer having a plurality of color channels, means for applying monochrome television signals from said source to a first one of said channels; means coupled to said source for inverting the signals received therefrom; means coupled to said last-named means for replacing the blanking pulses of said inverted signals by blanking pulses of the same polarity as the blanking pulses of said monochrome signals applied to said first channel, and means for applying such inverted signals having replaced blanking pulses to a second one of said channels.

2. Apparatus for synthesizing simultaneous color television signals from a monochrome television signal, which apparatus comprises: a source of monochrome television signals including recurrent blanking pulses of fixed, reference amplitude and image portions representative of alternate black and white areas of an image to be reproduced; a plurality of output terminals; means for applying monochrome television signals from said source to a first one of said terminals; means coupled to said source for inverting the signals received therefrom; means coupled to said last-named means for replacing the blanking pulses of said inverted signals by blanking pulses of the same polarity as the pulses of said monochrome signals applied to said first terminal, means for applying such inverted signals having replaced blanking pulses to a second one of said terminals; a colorplexer having a plurality of input color channels; and switching means operatively connected to said terminals for selectively connecting said terminals to different ones of such colorplexer input channels.

3. In a color television system of the type which includes a plurality of separate component color channels each of which is responsive to the amplitude of a signal applied thereto to produce a color image of one of such component colors, apparatus for synthesizing color television signals from a monochrome television signal, which apparatus comprises: a colorplexer having a plurality of color-designated channels, each representative of one of such component colors; a source of television signals including image portions representative of alternate black and white areas of an object and further including blanking pulses of fixed, reference amplitude; means for applying signals from said source to one of said colorplexer color channels such that said signals are effective to control the color image production of the component color of that channel; polarity reversing means coupled to said source in signal-receiving relation for inverting signals from said source including such blanking pulses; a source of blanking pulses corresponding in time and sense to those of said television signals; means for adding blanking pulses from said last-named source to said inverted signals to produce a modified signal whose image portions are of the opposite sense from but whose blanking pulses are in the same sense as the signals applied to said one of said color channels; and means for applying such modified signal to a second one of said colorplexer color channels.

References Cited in the file of this patent

UNITED STATES PATENTS

| | | |
|---|---|---|
| 2,580,083 | Doba et al. | Dec. 25, 1951 |
| 2,693,530 | Macdonald | Nov. 2, 1954 |

OTHER REFERENCES

Buchsbaum: Color TV Instrumentation, Radio-Electronic Engineering, March 1954, pages 5 and 6.

UNITED STATES PATENT OFFICE

CERTIFICATE OF CORRECTION

Patent No. 2,874,212 February 17, 1959

Fred Lorin Bechly

It is hereby certified that error appears in the above numbered patent requiring correction and that the said Letters Patent should read as corrected below.

In the grant, line 1, and in the heading to the printed specification, line 4, name of inventor, for "Fred Lorin Bechley" read -- Fred Lorin Bechly --, each occurrence; in the heading to the sheet of drawing, containing figures 1 to 4, line 1, for "F. L. BECHLEY" read -- F. L. BECHLY --; column 4, line 51, for "Fig. 3" read -- Fig. 4 --.

Signed and sealed this 11th day of August 1959.

(SEAL)

Attest:

KARL H. AXLINE

Attesting Officer

ROBERT C. WATSON

Commissioner of Patents